(12) United States Patent
Buck et al.

(10) Patent No.: US 12,123,398 B2
(45) Date of Patent: Oct. 22, 2024

(54) ROTOR BLADE WITH NOISE REDUCTION MEANS

(71) Applicant: Siemens Gamesa Renewable Energy A/S, Brande (DK)

(72) Inventors: Steven Buck, Boulder, CO (US); Phillip Joseph, Southampton (GB); Stefan Oerlemans, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/768,676

(22) PCT Filed: Oct. 9, 2020

(86) PCT No.: PCT/EP2020/078442
§ 371 (c)(1),
(2) Date: Apr. 13, 2022

(87) PCT Pub. No.: WO2021/078539
PCT Pub. Date: Apr. 29, 2021

(65) Prior Publication Data
US 2024/0110544 A1    Apr. 4, 2024

(30) Foreign Application Priority Data
Oct. 23, 2019 (EP) .................................. 19204869

(51) Int. Cl.
*F03D 7/02* (2006.01)
*F03D 7/04* (2006.01)

(52) U.S. Cl.
CPC .......... *F03D 7/0296* (2013.01); *F03D 7/042* (2013.01); *F05B 2240/21* (2013.01); *F05B 2260/962* (2013.01)

(58) Field of Classification Search
CPC .............. F03D 80/005; F03D 7/0296; F05B 2260/962; F05B 2260/96; F05B 2270/333; B64C 2220/00
See application file for complete search history.

(56) References Cited

U.S. PATENT DOCUMENTS

| 5,141,391 A | 8/1992 | Acton et al. |
| 5,420,383 A * | 5/1995 | Kousen ................. F04D 29/663 |
| | | 181/206 |

(Continued)

FOREIGN PATENT DOCUMENTS

| EP | 3 249 216 A1 | 11/2017 |
| ES | 2 327 696 A1 | 11/2009 |
| WO | WO-2020088972 A1 * | 5/2020 ............. F03D 17/00 |

OTHER PUBLICATIONS

International Search Report & Written Opinion for PCT/EP2020/078442 issued Feb. 1, 2021.

*Primary Examiner* — Topaz L. Elliott
(74) *Attorney, Agent, or Firm* — Schmeiser, Olsen & Watts LLP

(57) ABSTRACT

A rotor blade with a leading edge and a trailing edge is provided, wherein the rotor blade is designed and configured for being exposed to a fluid flowing substantially from the leading edge to the trailing edge, the rotor blade includes at least two sensors designed for detecting flow characteristics of the fluid and providing respective sensor signals, and the rotor blade further includes at least two actuators for producing an anti-noise signal based on a sensor signal, the sensors are arranged spanwise and the actuators are arranged chordwise at the surface of the rotor blade, and the actuators are arranged and prepared such that flow-induced edge noise of the rotor blade, which is generated by the fluid, is at least (Continued)

partly cancelled out by the anti-noise signal. Also provided is a method for creating such rotor blade and a related wind turbine.

14 Claims, 5 Drawing Sheets

(56) References Cited

U.S. PATENT DOCUMENTS

| | | | |
|---|---|---|---|
| 6,851,930 B2* | 2/2005 | Pal | F04D 29/663 |
| | | | 416/500 |
| 9,889,931 B2* | 2/2018 | Xu | H04R 3/005 |
| 10,502,187 B2* | 12/2019 | Enevoldsen | F03D 7/0296 |
| 11,384,732 B2* | 7/2022 | Asheim | F03D 1/0633 |
| 11,462,204 B2* | 10/2022 | Buck | F03D 1/0633 |
| 2004/0057827 A1* | 3/2004 | Pal | F04D 29/681 |
| | | | 416/42 |
| 2009/0097976 A1 | 4/2009 | Driver et al. | |
| 2012/0025530 A1 | 2/2012 | Kinzie et al. | |
| 2014/0054894 A1* | 2/2014 | Olesen | F03D 7/00 |
| | | | 290/44 |
| 2014/0142888 A1 | 5/2014 | Duncan et al. | |
| 2016/0063987 A1* | 3/2016 | Xu | G10K 11/17881 |
| | | | 381/71.14 |
| 2017/0174334 A1* | 6/2017 | Beckman | G10K 11/17875 |
| 2017/0342960 A1* | 11/2017 | Enevoldsen | F03D 7/0296 |
| 2022/0128029 A1* | 4/2022 | Kimilli | F03D 7/0256 |
| 2022/0349380 A1* | 11/2022 | Buck | G10K 11/17873 |

* cited by examiner (State of the art)

ROTOR BLADE WITH NOISE REDUCTION MEANS

CROSS-REFERENCE TO RELATED APPLICATIONS

This application claims priority to PCT Application No. PCT/EP2020/078442, having a filing date of Oct. 9, 2020, which claims priority to EP Application No. 19204869.2, having a filing date of Oct. 23, 2019, the entire contents both of which are hereby incorporated by reference.

FIELD OF TECHNOLOGY

The following relates to a rotor blade with noise reduction means, especially for a wind turbine. The rotor blade is designed and configured for being exposed to a fluid, e.g., air, wherein flow-induced edge noise of the rotor blade is minimized by embodiments of the invention. The following is furthermore related to a wind turbine with at least one such rotor blade.

BACKGROUND

When a rotor blade with a leading edge and a trailing edge is exposed to a fluid, such as air, flowing substantially from the leading edge to the trailing edge of the rotor blade, noise is typically generated at the edges of the rotor blade, e.g., due to eddies. The intensity of the noise and the frequency of the noise depends on many parameters, such as the properties of the fluid and the properties of the edge, namely the size of the edge and the shape of the edge, e.g., whether it is rounded or sharp.

Trailing edge noise emitted from a wind turbine blade is the dominant noise generation mechanism for modern industrial scale wind turbines. Significant effort and money have been invested in noise reduction technologies, e.g., including serrations currently used on new onshore turbines. The noise from wind turbines often dictates the regions where the machines can be erected, or correspondingly dictates the manner in which the machine can be operated. Often, wind turbines are running in curtailed operational modes, sacrificing power output for noise reduction. Thus, the noise emission of a turbine directly affects negatively its economic viability when these conditions exist.

As this issue is known since several years, various approaches for reducing flow-induced edge noise of a rotor blade have been proposed. These approaches include the shape and the design of the airfoil. In this context, particularly the shape and the design of the trailing edge of the rotor blade is of utmost importance. Aerodynamic add-ons may be added to or included in the rotor blade in order to minimize the flow-induced edge noise of the rotor blade. Well-known add-ons for noise reduction are serrations such as a serrated panel which is mounted to the pressure side or suction side of the rotor blade close to the trailing edge. However, the still existing and the still generated flow-induced edge noise could still be considerable.

Lately, a technology development project has been launched to develop an active noise cancellation system for wind turbine trailing edge noise. Patent application EP 3249216 A1 discloses a system which uses measured unsteady surface pressures on the blade of a wind turbine to feed an anti-noise controller that generates an inverted acoustic signal, negating the trailing edge noise in the far field. However, active solutions are in early stages of development.

SUMMARY

An aspect relates to systems, devices and methods to facilitate an improvement regarding noise reduction concerning rotor blades (with active means).

A rotor blade according to embodiments of the invention has a leading edge and a trailing edge and is designed and configured for being exposed to a fluid flowing substantially from the leading edge to the trailing edge of the rotor blade. For example, the rotor blade is a rotor blade of a wind turbine. The rotor blade comprises at least two sensors designed for detecting flow characteristics of the fluid and providing respective sensor signals, and the rotor blade further comprises at least two actuators for producing an anti-noise signal based on a sensor signal. The sensors and the actuators are arranged at the surface of the rotor blade in that the sensors are arrange spanwise and the actuators are arranged chordwise. Furthermore, the actuator is arranged and prepared such that flow-induced edge noise of the rotor blade, which is generated by the fluid, is at least partly cancelled out by the anti-noise signal.

A rotor blade typically comprises a root (connected with the axis of the rotor) and a tip. In action, it moves in a predefined direction, wherein the edge pointing in the direction of moving is the leading edge and the opposite edge is the trailing edge. Since a rotor blade is formed that it produces a pressure difference between its two surfaces, the rotor blade comprises a pressure side and a suction side. The rotor blade is characterized by a span, which is a straight-line projecting away from the root in direction of the tip. and a chord pointing from the leading edge to the trailing edge oriented perpendicular to the span.

The rotor blade comprises at least two sensors, at least 3, 5, 7 or more sensors, for detecting flow characteristics of the fluid. The sensors produce sensor signals based on the detected flow characteristic. These sensor signals are pressure values or pressure signals, however, they may also (or instead) contain information about the direction and/or velocity of flow.

The arrangement of sensors (and actuators) can be called a group. It is preferred that each group of sensors corresponds with a chordwise distribution of actuators (that are also members of the group). It is preferred to arrange groupings of spanwise sensors of approximately 0.5 m-2 m in length, each group corresponding to a chordwise distribution of actuators to cancel that section's noise emission. Thus, it is preferred that a group of sensors cover at least 0.3 m of the span of a rotor blade, at least 1 m, particularly at least 2 m. The sections of groups may overlap; however, it is preferred that each group covers an individual section, wherein the sections do not overlap.

It should be noted that the reduction or elimination of the noise is achieved by the use of anti-noise. Since flow-induced edge noise is typically a broadband noise source, caused by a turbulent flow, it is random. Thus, the acoustic pressure fluctuations are nondeterministic, meaning that they cannot be predicted in a temporal sense on the basis of the current or earlier acoustic signals, even when the statistical properties are known. With the spanwise arrangement of sensors, the noise can be predicted very accurately.

The rotor blade comprises at least two actuators, at least 3, 5, 7 or more actuators. The actuators on the rotor blade are designed for producing an anti-noise signal. There could be one actuator or two or more actuators for each group of sensors. Although it is preferred that the signals of two or more sensors are used to create the anti-noise signal of one single actuator, it is also possible that the signal of one single sensor is used to create the output signal of one single actuator (e.g., there is one actuator connected with each sensor). Also, the case is preferred that signals of sensors are used interleaved in that the signal of at least one sensor is used to create the output signal of two or more actuators, wherein the output signal of at least one of these actuators is created with the use of the signal of another sensor.

The sensors and the actuators are arranged at the surface of the rotor blade. This means that sensors and actuators are somehow integrated or added to the rotor blade at its surface. In order to prevent disadvantageous aerodynamic effects one option is to submerge and insert the sensor and the actuator into the shell or surface part of the rotor blade such that they are in contact with the surrounding air, but they do not stick out and produce additional turbulence on the surface of the rotor blade.

The sensors are arranged spanwise, i.e., in a direction along the span, in a line. The actuators are arranged chordwise, i.e., in a direction along a chord, in a line. The spanwise distribution of sensors associated with group of chordwise-aligned actuators allows a creation of an anti-noise signal based on noise radiated from the entire spanwise section of the rotor blade where the sensors are arranged. As said above, it is preferred that the sensors will be arranged in arrangements of one or more groups along the span, say 1 m-2 m in spanwise length, and one set of chordwise actuators will likely be associated with a group of spanwise sensors, wherein it is preferred that multiple of these groupings will exist along the rotor blade (on both sides of the blade). Especially a controlling unit can be fed with the sensor signals and determine anti-noise signals for the actuators (of one group).

The actuators must be arranged and prepared such that flow-induced edge noise of the rotor blade, which is generated by the fluid, is at least partly cancelled out by the anti-noise signal. Such preparation is generally known e.g., by the disclosure of above-mentioned patent application EP 3249216 A1. However, with the special arrangement of the sensors and the actuators, embodiments of the present invention represent a refinement of the idea of actively canceling noise. The actuators aligned with the sensors should emit an anti-noise signal that represents the anti-noise of the total sound radiated from the spanwise section where the sensors are arranged (and detect this sound). In an ideal environment, a single chordwise distribution of sensors could be able to cancel the noise emitted from an arbitrary long blade section, so long as observers at a location where the noise is to be canceled still reside in the geometric far-field, i.e., greater than about 5 blade-section lengths away.

The chordwise distribution of actuators provides control over the directivity of the emitted anti-noise signal. The phase interaction of the respective actuator outputs in the far-field results in a non-uniform directivity, which can be approximately matched to the non-uniform directivity emitted by the trailing edge noise itself. This allows the system to achieve noise cancellation over a broad range of directions about the blade.

The sensor outputs from a group of spanwise sensors (e.g., unsteady pressure sensors) are used to generate a real-time prediction of the noise emitted from the respective blade section covered by the sensors. The predicted noise emission is based on physical models relating the unsteady surface pressure on an airfoil to its emitted acoustic noise. The relation between the measured surface pressure and the far-field noise can further be tuned based on experimentation and can also depend on e.g., the trailing edge geometry or the presence of serrations. As the emission from the blade section is a function of an observer's location relative to the blade section, i.e., the emission directivity—the anti-noise signals passed to chordwise distributed actuators, e.g., speakers-must also reflect this observer location dependence. In order to most effectively cancel the noise at a broad range of observer locations, the anti-noise generation algorithm should reflect the trailing edge noise directivity and will likely be based on a control strategy that minimizes the summed mean-squared noise levels at a distribution of observer locations relative to the blade section.

As said above, according to embodiments of the invention it is possible that each sensor is aligned with one single actuator. However, it is particularly preferred that the signals of the at least two sensors together (or three or more sensors) are used to create at least two spatial anti-noise signals that are then emitted by the at least two actuators.

A method according to embodiments of the invention for constructing a rotor blade, comprises the following steps:
  Providing a rotor blade with a leading edge and a trailing edge, wherein the rotor blade is designed and configured for being exposed to a fluid flowing substantially from the leading edge to the trailing edge.
  Providing at least two sensors designed for detecting flow characteristics of the fluid and providing respective sensor signals and at least two actuators designed for producing an anti-noise signal based on a sensor signal.
  Arranging the sensors spanwise at the surface of the rotor blade, and arranging the actuators chordwise at the surface of the rotor blade, wherein the actuators are arranged and prepared such that flow-induced edge noise of the rotor blade, which is generated by the fluid, is at least partly cancelled out by the anti-noise signal.

A wind turbine according to embodiments of the invention comprises at least one rotor blade according to embodiments of the invention or manufactured with a method according to embodiments of the invention.

It should be noted that the term 'actuator' has to be understood in a broad sense, e.g., as any means which is able to transform an electrical signal or a pressure signal into a physical, mechanical movement. Examples of such an actuator are a membrane or a loudspeaker or a morphing surface of the rotor blade. An 'actuator' could include any means which is suitable and capable for producing the desired anti-noise signal which is subsequently used in order to at least partly cancelling out the flow-induced edge noise.

Likewise, the mentioned 'sensor' also has to be understood in a broad sense as any means which is capable to detect the flow characteristics of the fluid passing by the sensor. The sensor may, for example, also comprise a membrane. It may also comprise some sort of microphone. In the simplest form, the sensor may just be a small opening in the surface which senses the fluctuating surface pressure induced by the fluid, which is passing by the opening, such that this pressure then induces and produces the anti-noise signal.

According to a preferred rotor blade, the sensors are arranged in a spanwise line along the trailing edge of the rotor blade. As said above, the inventors found out that a spanwise distribution of sensors (i.e., along the span of the blade) has the advantage that actuators at a single spanwise location could cancel the total noise from an extended spanwise section, rather than a very narrow region characterized by a single sensor. Thus, the use of more than one sensor signal to create the anti-noise signal of one actuator is especially preferred together with the spanwise arrangement of sensors.

According to a preferred rotor blade, the sensors are located downstream of the actuators with regard to the flow direction of the fluid. The actuators use the signal of at least one of these sensors (especially of all sensors) for creating their anti-noise signals.

According to a preferred rotor blade, a sensor comprises a microphone (e.g., a surface microphone) and an actuator comprises a loudspeaker and is arranged and prepared to emit a sound signal with the loudspeaker. Microphones and loudspeakers are well-known and readily available, inexpensive devices which can be integrated or added to a rotor blade at almost any size in a simple and inexpensive manner, without affecting the aerodynamic flow around the blade.

According to a preferred rotor blade, a sensor comprises a surface pressure transducer and an actuator comprises a membrane and is arranged and prepared to induce at least partial cancellation of unsteady surface pressures with the membrane. Suitable pressure transducers are well-known and well-proven and may be added or implemented and included to a rotor blade without large expenses or changes to that rotor blade.

According to a preferred rotor blade, at least one additional actuator is arranged in spanwise direction relative to the other actuators. For example, there is a chordwise line of actuators and one actuator (or more actuators in a second chordwise line) alongside these actuators, adjacent to one of the other actuators. A such arranged additional actuator may even touch one of the other actuators.

According to a preferred rotor blade, the anti-noise signal of an actuator is based on the sensor signals from at least two sensors, from three or more sensors.

A preferred rotor blade further comprises a control unit for constructing the anti-noise signal, arranged such that the actuators are connected with at least one of the sensors via the control unit.

According to a preferred rotor blade, a number of sensors (of a group) is located at the suction side and a number of sensors is located at the pressure side. The actuators using the sensor signals of this group of sensors are located at the pressure side and the suction side, however, actuators may also be arranged on one of these sides, only.

According to a preferred rotor blade, the actuator and/or a control unit is connected with at least one of the sensors via connection means, wherein the connection means are designed to guide an electric signal or a pressure signal. In the case that the connection means are designed to guide an electric signal, they are wires. If the connection means are designed to guide pressure, they are designed as flexible tubes or channels.

A preferred rotor blade comprises at least three sensors arranged in a non-uniform arrangement, arranged with a quadratic, exponential, chaotic or logarithmic spacing, or arranged in an alternating non-linear way such that along the arrangement of sensors there are alternating long and short spacings, wherein the spacings are non-periodical.

As said above, the at least three sensors are arranged with a non-uniform spacing (at least in lateral direction at the surface). This means that although the sensors may be all arranged even with the surface or protruding similarly from the surface of the rotor blade, at least the lateral distance of adjacent sensors must not be uniform. The sensors may be arranged chaotically in an area; however, it is preferred that they are arranged in a line or a number of lines (with non-uniform spacing to adjacent sensors). It is especially preferred that all distances between adjacent sensors have differing values so that even no periodic arrangements exist.

In an embodiment of the invention, the rotor blade comprises a portion which has the shape of an airfoil comprising a pressure side and a suction side, and the pressure side and the suction side are each confined by the trailing edge and the leading edge of the rotor blade. In other words, the preferred rotor blade is a lift producing rotor blade which has at least partly the shape of an airfoil. An airfoil is characterized in that it comprises a pressure side and a suction side and is able to produce lift when it is exposed to a fluid flowing substantially from the leading edge to the trailing edge of the rotor blade. As it is well-known to the person skilled in the art, the outer surface of such an airfoil shaped rotor blade is characterized by one portion which is referred to as the pressure side and which is confined at one side by the trailing edge and on the other side by the leading edge and the remaining part of the surface is typically referred to as the suction side of the rotor blade.

The rotor blade is designed to be used for a wind turbine. However, the inventive concept is not limited to flow-induced edge noise of rotor blades of a wind turbine. It can also be applied to reduce flow-induced edge noise from, for example, aircraft wings, helicopter blades, fans, etc.

The advantage of the special arrangement of sensors and actuators according to embodiments of the invention would render the performance of the rotor blade more efficient while less actuators have to be used. Although a grid of sensors dispersed over the suction side of a blade may provide the same information as embodiments of the invention, the information of sensors provided further upstream from the trailing edge would be effectively useless due to the decorrelation of the spatial turbulences conditions upstream from the turbulences near the trailing edge. The latter of being what radiates acoustic energy due to its interaction with the edge. Thus, embodiments of the invention reduce the number of sensors and, by that the total costs.

In addition, the chordwise distribution of actuators gives control over the total secondary source (actuator array) directivity in the polar direction, i.e., the plane perpendicular to the spanwise direction via phase interaction of the multiple actuators. In an ideal case the secondary sources would identically match the directivity of the primary sources (the blade's trailing edge noise) such that the noise can be cancelled everywhere. The chordwise distribution simply gives an efficient approximation of this case, where the directivity is controlled in the polar direction and the directivity is naturally dipole-like in the plane perpendicular to the chord.

An infinite number of arrangements of sensors and/or actuators is possible.

BRIEF DESCRIPTION

Some of the embodiments will be described in detail, with reference to the following figures, wherein like designations denote like members, wherein.

DETAILED DESCRIPTION

Figure 1:
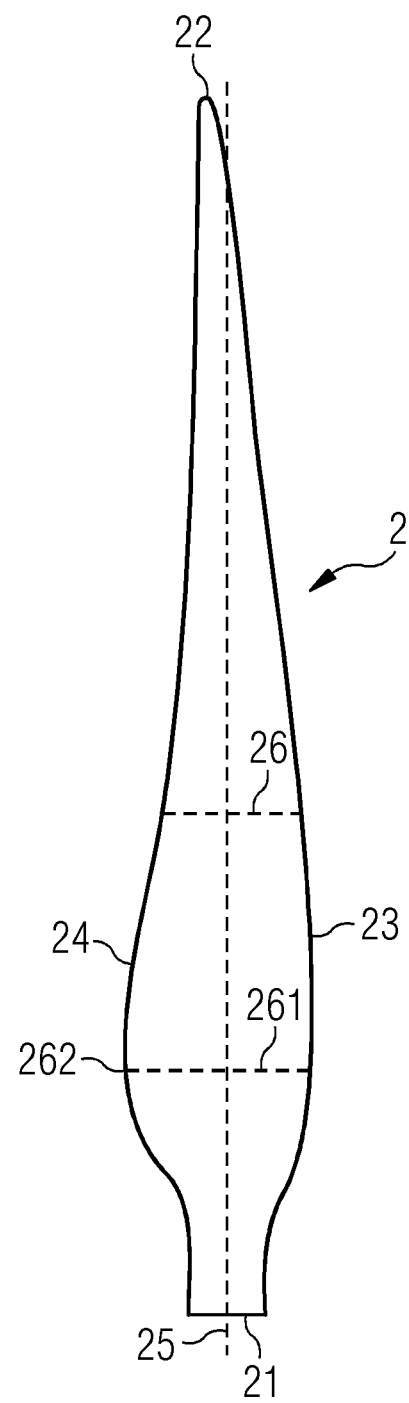
FIG. 1 shows a rotor blade.

FIG. 1 shows a rotor blade 2. The rotor blade 2 comprises a root 21 and a tip 22 as well as a leading edge 23 and a trailing edge 24. The figure illustrates a top view or planar view onto the rotor blade 2, namely onto the pressure side of the rotor blade. The rotor blade 2 is characterized by a span 25, which is a straight-line projecting away from the root 21. In the case of a rotor blade 2 of a wind turbine 1 (see e.g., FIG. 6), wherein the rotor blade 2 is pitchable about a pitch axis.

Furthermore, a plurality of chords 26 may be assigned to the rotor blade 2. Each chord 26 is oriented perpendicular to the span 25. Therefore, for each spanwise position starting at the root 21 in direction of the tip 22, a chord 26 may be defined. The chord 26 which is maximum (i.e., which has a maximum length or extension), is referred to as the maximum chord 261. The area where the maximum chord 261 is located is referred to as the shoulder 262 of the rotor blade 2.

If the rotor blade 2 moves in a fluid, e.g., air, the unsteady surface pressure pattern, that generates the sound at the edge, can be considered to convect unchanged with the flow along the chord 26 of the rotor blade 2. Note that in practice this unchanged convection happens until a certain degree. This means that minimum changes of the unsteady surface pressure pattern are possible. This phenomenon is referred to in the literature as the 'frozen turbulence' assumption. In embodiments of the present invention, this fact is used to detect the unsteady surface pressures upstream of the edge so that a noise cancelling anti-noise signal can be constructed and emitted in anti-phase at the moment when the turbulent eddies, which are responsible for the unsteady surface pressure pattern and noise generation, pass the edge.

Figure 2:
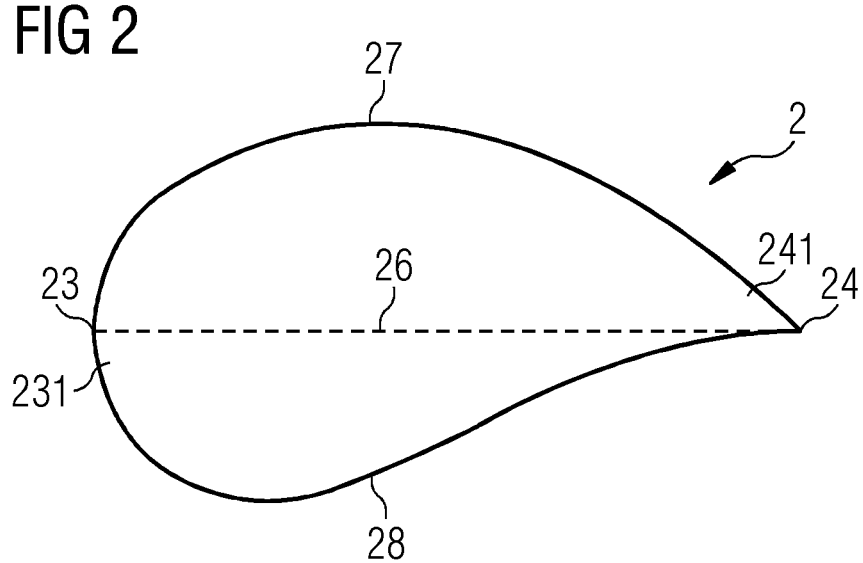
FIG. 2 shows a profile of the rotor blade at a certain spanwise position.

FIG. 2 shows a schematic view of an airfoil of the rotor blade 2. This airfoil or profile is taken perpendicular to the span 25 of the rotor blade 2. In other words, this profile is a cross-sectional view at a specific radial position or spanwise position of the rotor blade 2. The leading edge 23 can be seen and described as a relatively round edge, whereby the trailing edge 24 is relatively sharply designed. The straight line connecting the leading edge 23 with the trailing edge 24 is referred to as the chord 26.

Note that the whole area from the leading edge 23 up to ten percent of the chord length of the chord 26 as measured from the leading edge 23 is referred to as the leading-edge section 231. Likewise, the area which is within ten percent chord wise length away from the trailing edge 24 is referred to as the trailing edge section 241.

Note that in this schematic view the maximum thickness of the airfoil which is defined as the distance between the pressure side 28 of the suction side 27 is relatively large. This thickness often times considerably decreases towards the tip 22 of the rotor blade, at least in modern rotor blades 2 of wind turbines 1.

Figure 3:
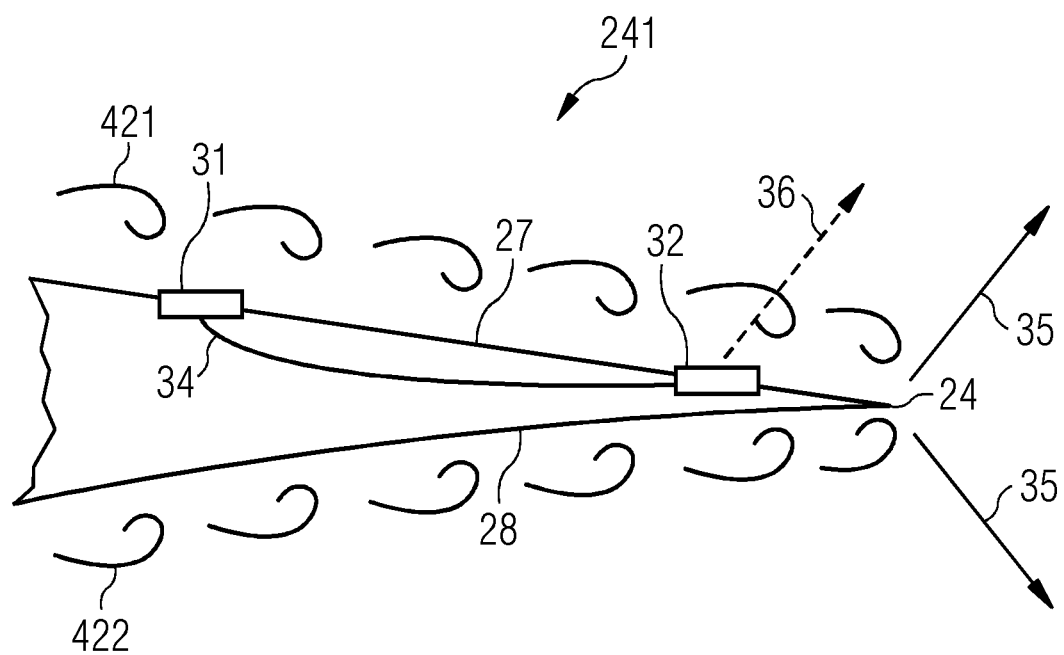
FIG. 3 shows an embodiment of the state of the art comprising a sensor and an actuator, which are directly connected via connection means.

FIG. 3 shows a trailing edge section 241 according to the state of the art, comprising a sensor 31, one sensor 31 being positioned at the suction side 27 of the rotor blade 2 and directly connected with an actuator 32. The sensor 31 is located upstream with regard to the actuator 32 which is arranged and positioned at the suction side 27 of the rotor blade 2.

The sensor 31 is connected with the actuator 32 via connection means 34. The actuator 32 is configured to produce the anti-noise signal 36 based on the input which is received by the sensor 31. The anti-noise signal 36 which is emitted by the actuator 32 is symbolized by the dashed arrow.

The anti-noise signal 36 is deliberately chosen such that it destructively interferes with the noise 35 which is generated and emitted at the trailing edge 24 of the rotor blade 2. Note that here two main directions of the noise 35 are visualized by the two arrows, one projecting away from the trailing edge 24 into the direction of the suction side 27, and one projecting away from the trailing edge 24 into the direction of the pressure side 28. In the exemplary embodiment of the figure, the anti-noise signal 36 mainly cancels out or minimizes the noise 35 which is emitted and generated at the trailing edge 24 into the direction of the suction side 27. If desired, a pressure-side actuator 32 (not shown) could be added to also eliminate the noise 35 emitted to the pressure side 28. Also note the turbulent boundary layer which is symbolized by suction side eddies 421 and pressure side eddies 422. The overall flow direction of the fluid is symbolized by reference sign 41.

Figure 4:
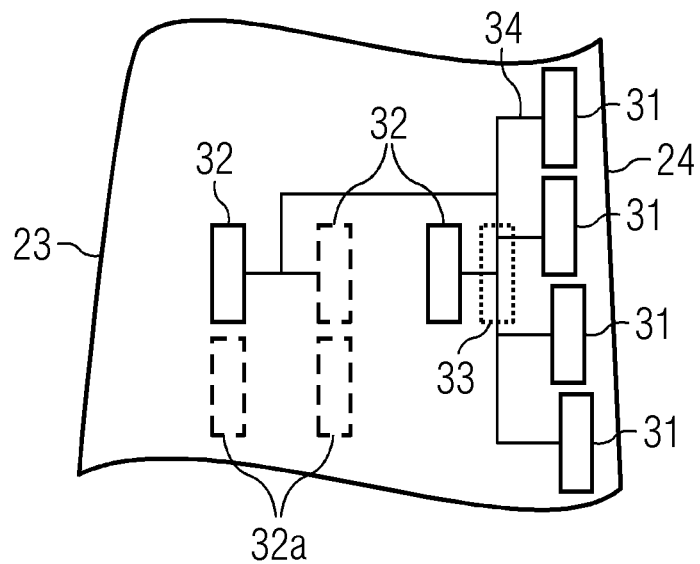
FIG. 4 shows an embodiment of the invention comprising a number of sensors and an actuator, which are directly connected via connection means.

FIG. 4 shows an embodiment of the invention comprising four sensors 31 and three actuators 32, which are directly connected via connection means 34. The sensors 31 and the actuators 32 are arranged at the surface of the rotor blade 2, wherein the sensors 31 are arranged in a spanwise arrangement along the trailing edge and the actuators 32 are arranged in a chordwise arrangement. The rotor blade 2 has a leading edge 23 and a trailing edge 24 and is designed and configured for being exposed to a fluid flowing substantially from the leading edge 23 to the trailing edge 24.

The rotor blade 2 comprises here three actuators 32 for producing an anti-noise signal 36 (see e.g., FIG. 3) based on a sensor signal of all four sensors 31. The actuators 32 are connected with the sensors 31 via connection means 34. Optionally there could be a control unit 33 (dashed) between the sensors 31 and the actuator 32 to create the anti-noise signal from the sensor signals. The actuator 32 is arranged and prepared such that flow-induced edge noise 35 of the rotor blade 2, which is generated by the fluid, is at least partly cancelled out by the anti-noise signal 36. The chordwise distribution of actuators 32 provides control over the directivity of the emitted anti-noise signal the phase interaction of the respective actuator outputs in the far-field results in a non-uniform directivity, which can be approximately matched to the non-uniform directivity emitted by the trailing edge noise itself. This allows the system to achieve noise cancellation over a broad range of directions about the blade. It should be noted that although the noise emission about the turbine shows some asymmetry, the noise cancellation should likely be in both directions. Thus, it is preferred that the arrangement shown should be applied on the suction side 27 of the rotor blade 2 as well as on the pressure side 28.

With dashed lines, two additional actuators 32a are shown in a position shifted spanwise to the positions of two of the other actuators 32.

Figure 5:
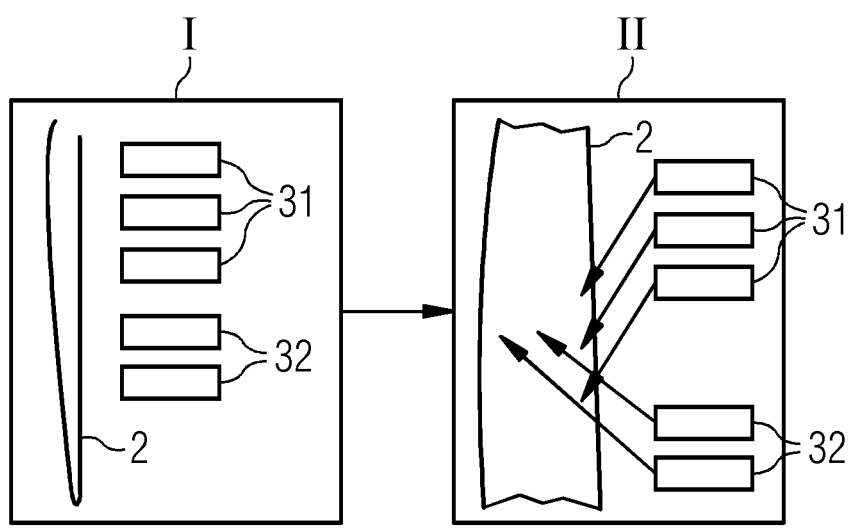
FIG. 5 shows a block diagram of the process flow of a preferred method according to embodiments of the invention.

FIG. 5 shows a block diagram of the process flow of a preferred method according to embodiments of the invention.

In step I, a rotor blade 2 (see e.g., FIG. 1), three sensors 31 and two actuators 32 are provided. As said above, the sensors 31 are designed for detecting flow characteristics of the fluid and providing respective sensor signals and the two actuators 32 are designed for producing an anti-noise signal 36 based on a sensor signal.

In step II, the sensors 31 are arranged spanwise at the surface at the trailing edge 24 of the rotor blade 2 (see arrows), the actuators 32 are arranged chordwise at the surface of the rotor blade 2 (see arrows), wherein the actuators 32 are arranged and prepared such that flow-induced edge noise 35 of the rotor blade 2, which is generated by the fluid, is at least partly cancelled out by the anti-noise signal 36.

Figure 6:
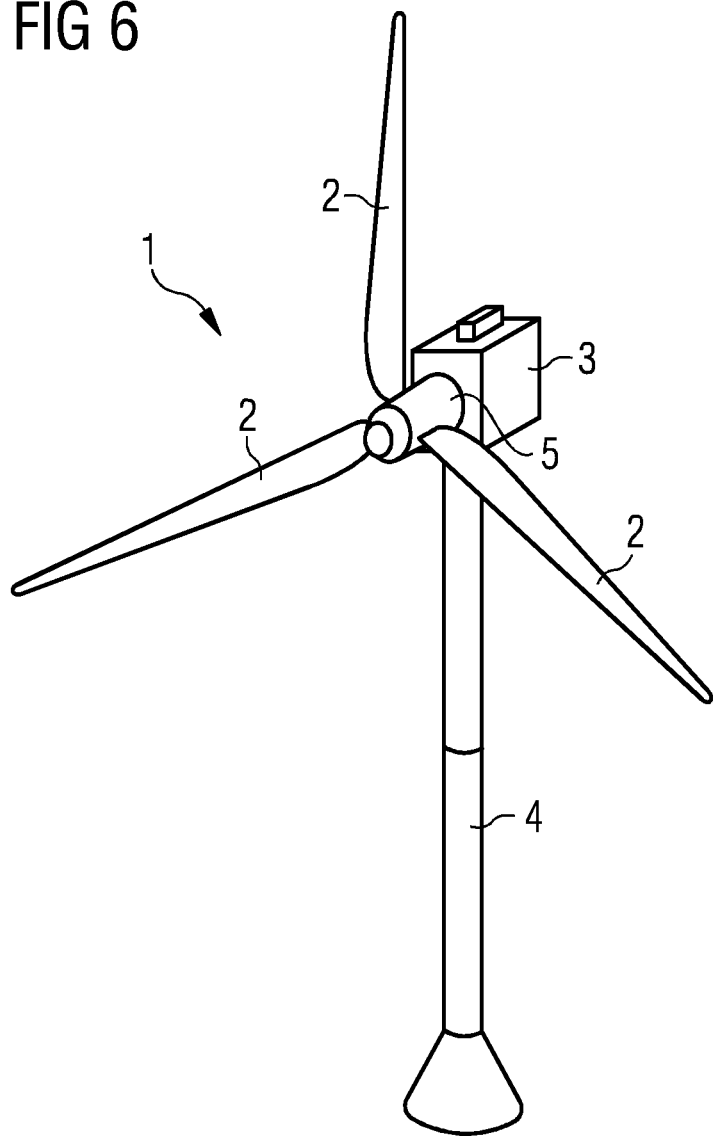
FIG. 6 shows an embodiment of a wind turbine according to embodiments of the invention.

FIG. 6 depicts a wind turbine 1 according to embodiments of the invention having three rotor blades 2 with sensor and actuator configurations in accordance with embodiments of the present invention (see e.g., FIG. 4). The rotor blades 2 connect to a hub 5 of the wind turbine 1. The hub 5 is connected to a nacelle 3 that is atop a wind turbine tower 4.

Figure 7:
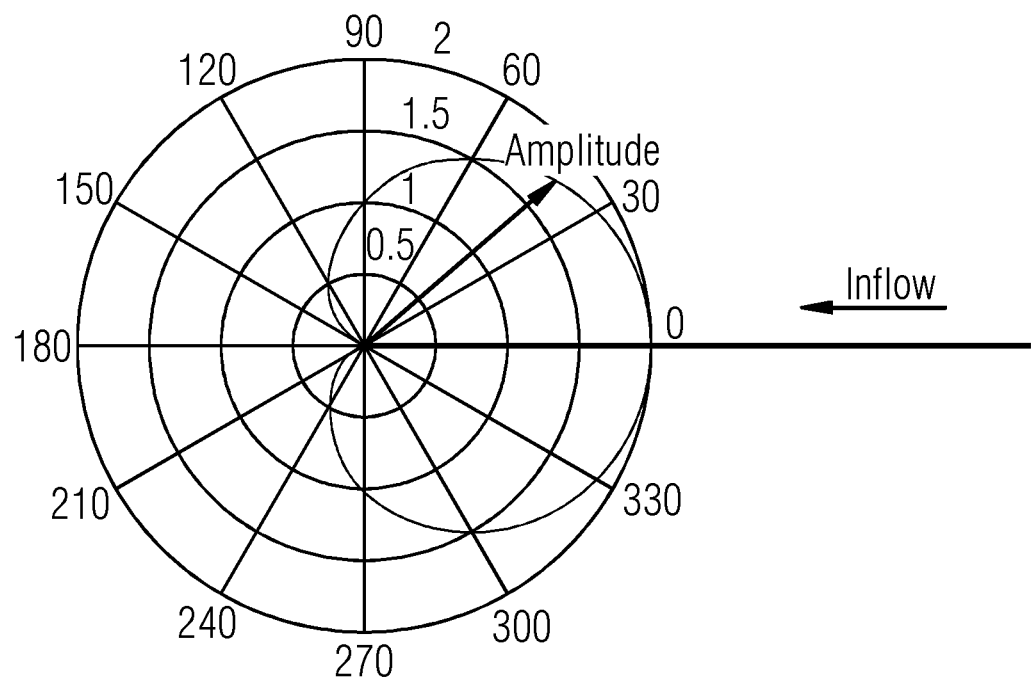
FIG. 7 shows a theoretical directivity pattern of trailing edge noise.

FIG. 7 shows a theoretical directivity pattern of trailing edge noise, wherein the fluid flows in the direction of the arrow ("Inflow"). The inflow appears in the chordwise direction of the rotor blade. The cardioid (heart-shaped) curve depicts the amplitude of noise in chordwise direction, wherein the arrow "Amplitude" shows an example for the amplitude of the noise at a certain angle at about 40°. The chordwise distribution simply gives an efficient approximation of the case, where the directivity is controlled in the polar direction and the directivity is naturally dipole-like in the plane perpendicular to the chord (in Y- and Z-direction).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "device" does not preclude the use of more than one unit or device.

The invention claimed is:

1. A rotor blade with a leading edge and a trailing edge, wherein the rotor blade is designed and configured for being exposed to a fluid flowing substantially from the leading edge to the trailing edge the rotor blade comprising:
   at least two sensors configured for detecting flow characteristics of the fluid and providing respective sensor signals; and
   at least two actuators, each for producing an anti-noise signal based on at least one of the at least two sensor signals;
   wherein the at least two sensors are arranged spanwise and the at least two actuators are arranged chordwise at a surface of the rotor blade, and the at least two sensors are arranged in a group that corresponds with a chordwise distribution of the actuators;
   wherein the at least two actuators are arranged and prepared such that flow-induced edge noise of the rotor blade, which is generated by the fluid, is at least partly cancelled out by the anti-noise signals.

2. The rotor blade according to claim 1, wherein the at least two sensors are arranged in a spanwise line along the trailing edge and located downstream of the at least two actuators with regard to a flow direction of the fluid.

3. The rotor blade according to claim 1, wherein a sensor of the at least two sensors comprises a microphone and an actuator of the at least two actuators comprises a loudspeaker and is arranged and prepared to emit a sound signal with the loudspeaker and/or wherein a sensor of the at least two sensors comprises a surface pressure transducer and an actuator of the at least two actuators comprises a membrane and is arranged and prepared to induce at least partial cancellation of unsteady surface pressures with the membrane.

4. The rotor blade according to claim 1, wherein the group is arranged to cover at least 0.3 m of a span of the rotor blade, further wherein there are two or more groups of sensors and actuators arranged on the rotor blade.

5. The rotor blade according to claim 1, wherein at least one additional actuator is arranged in a spanwise direction relative to the at least two actuators, adjacent to one of the actuators.

6. The rotor blade according to claim 1, wherein the anti-noise signal of an actuator is based on the sensor signals from the at least two sensors.

7. The rotor blade according to claim 1, further comprising a control unit for constructing the anti-noise signal, arranged such that an actuator of the at least two actuators is connected with at least one of the at least two sensors via the control unit.

8. The rotor blade according to claim 1, wherein the at least two sensors comprise a number of sensors located at a suction side and a number of sensors located at a pressure side, and the actuators using the sensor signals of the sensors are located at the pressure side and/or the suction side.

9. The rotor blade according to claim 1, wherein the at least two actuators and/or a control unit is connected with at least one of the sensors via connection means, the connection means configured to guide an electric signal or a pressure signal, further wherein the connection means are wires or configured as flexible tubes or channels.

10. The rotor blade according to claim 1, wherein the at least two sensors comprise at least three sensors arranged in a non-uniform arrangement, or arranged in an alternating non-linear way such that along the arrangement of sensors there are alternating long and short spacings, wherein the spacings are non-periodical.

11. The rotor blade according to claim 1, comprising a portion which has the shape of an airfoil, wherein the rotor blade is configured to be used for a wind turbine.

12. A wind turbine comprising at least one rotor blade according to claim 1.

13. A method for constructing a rotor blade comprising:
   providing a rotor blade with a leading edge and a trailing edge, wherein the rotor blade is designed and configured for being exposed to a fluid flowing substantially from the leading edge to the trailing edge;
   providing at least two sensors configured for detecting flow characteristics of the fluid and providing respective sensor signals;
   providing at least two actuators, each configured for producing an anti-noise signal based on at least one of the at least two sensor signals;
   arranging the at least two actuators chordwise at a surface of the rotor blade; and
   arranging the at least two sensors spanwise at the surface of the rotor blade,
wherein the at least two sensors are arranged in a group that corresponds with a chordwise distribution of the actuators; and
wherein the at least two actuators are arranged and prepared such that flow-induced edge noise of the rotor blade, which is generated by the fluid, is at least partly cancelled out by the anti-noise signals.

14. A wind turbine comprising at least one rotor blade manufactured according to the method of claim 13.

\* \* \* \* \*